United States Patent [19]
Murakami et al.

[11] Patent Number: 5,706,028
[45] Date of Patent: Jan. 6, 1998

[54] POSITION INDICATOR

[75] Inventors: Azuma Murakami; Keiichi Sugiyama, both of Otone-machi, Japan

[73] Assignee: Wacom Co., Ltd., Otone-machi, Japan

[21] Appl. No.: 550,206

[22] Filed: Oct. 30, 1995

[30] Foreign Application Priority Data

Apr. 24, 1995 [JP] Japan ............... 7-123080

[51] Int. Cl.$^6$ ............................. G09G 5/08
[52] U.S. Cl. ............. 345/157; 345/163; 345/179
[58] Field of Search ........................ 345/156, 173, 345/179, 157, 145, 146, 163, 161, 180, 182, 183; 382/313, 314; 178/18, 19, 20, 87

[56] References Cited

U.S. PATENT DOCUMENTS

| | | | |
|---|---|---|---|
| 4,780,707 | 10/1988 | Sekler | 340/710 |
| 5,124,509 | 6/1992 | Hoendervoogt et al. | 178/19 |

FOREIGN PATENT DOCUMENTS

| | | | |
|---|---|---|---|
| 621120 | 3/1986 | Japan | G06F 3/03 |
| 406131100 | 5/1994 | Japan | G06F 3/03 |
| 006230886 | 8/1994 | Japan | G06F 3/03 |
| 406230880 | 8/1994 | Japan | G06F 3/03 |
| 006250772 | 9/1994 | Japan | G06F 3/03 |
| 007013684 | 1/1995 | Japan | G06F 3/03 |
| 007084709 | 3/1995 | Japan | G06F 3/03 |
| 007093083 | 4/1995 | Japan | G06F 3/03 |
| 007152470 | 6/1995 | Japan | G06F 3/03 |
| 007152472 | 6/1995 | Japan | G06F 3/03 |

OTHER PUBLICATIONS

Patent Abstrac of Japan,JP61062120,U.Toshiaki, Mar. 31, 1986.

Patent Abstract of Japan,JP63049820,I.Masayuki, Mar 2, 1988.

Patent Abstract of Japan,JP60107131,T. Takeo, Dec. 6, 1985.

*Primary Examiner*—Xiao Wu
*Attorney, Agent, or Firm*—Shlesinger Arkwright & Garvey LLP

[57] ABSTRACT

A position indicator for use in an input coordinate device for providing a desired coordinate point on a position detecting plane, comprises a chassis having both a pen shaped portion formed by a substantially cylindrical portion and a mouse portion including a flat bottom; a first indicating circuit, disposed within the pen shaped portion, including a core body having an end extending externally from the pen shaped portion and a first switch; a second indicating circuit, disposed within the mouse portion, including a second switch; a third switch adapted to inhibit operation of the first indicating circuit when the second indicating circuit is being used; and a movable member extending from the flat bottom such that the member is engageable with the detecting plane when the mouse portion is in use, the member being operably connected to the third switch such that movement of the member when engaged with the detecting plane is effective to operate the third switch so as to render the first indicating circuit inoperative when the mouse portion is in use.

15 Claims, 5 Drawing Sheets

Fig. 1

PRIOR ART

POSITION INDICATOR

BACKGROUND OF THE INVENTION

1. Field of the Invention

The present invention relates to a position indicator used in a coordinate input device generally called a tablet or digitizer.

2. Description of the Prior Art

Figure 1:
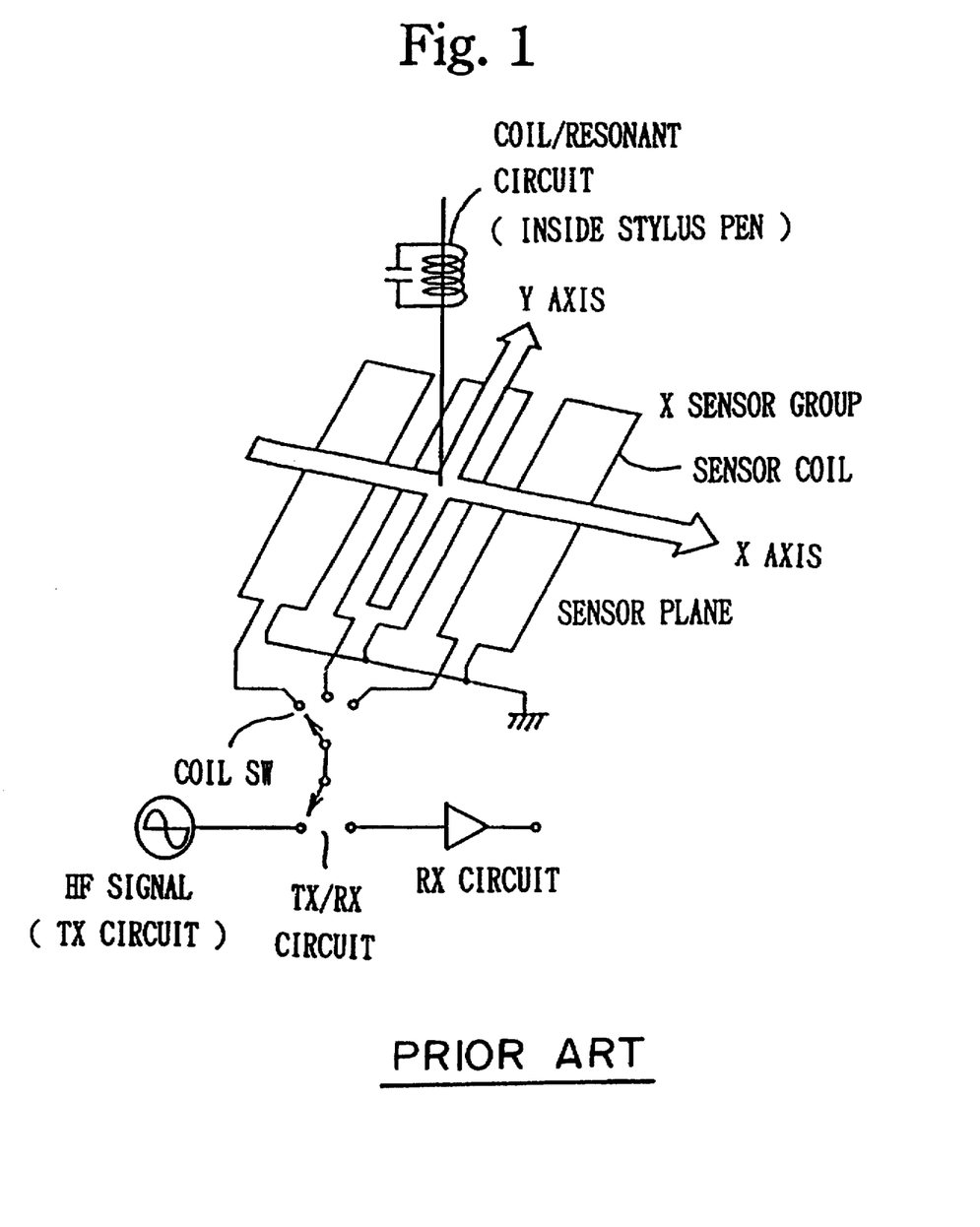
FIG. 1 is a schematic drawing of a coordinate input device according to an electromagnetic transceive system.

A tablet is used as an input device for an absolute coordinate of two dimensions in a data processing system, such as a computer system or CAD system, and comprises generally of a detecting plate having a position detecting plate and a position indicator. Several types of position detecting techniques are known in the coordinate input device. An electromagnetic transceiver system will be described as an example. The electromagnetic transceiver system has the feature of making the position indicator a cordless device. FIG. 1 is a schematic diagram for illustrating a basic operation of the system. The coordinate input device of the system comprises of a position detecting plane (sensor plane) positioned a number of sensor coils thereon parallel to a position detecting direction, and a stylus pen housing a coil or resonant circuit, or a position indicator such as a cursor.

Normally, a pair of sensor surfaces is disposed in X and Y directions orthogonally with respect to each other. In detecting the position of the device, an electromagnetic interaction is utilized which is located between the senor coil and the coil or resonant circuit positioned inside the position indicator.

The detecting operation will now be described with reference to FIG. 1, which is performed for each of the sensor coils during a position detecting process. First, a high frequency signal from the transmission circuit is applied to the selected coil so that an electromagnetic wave is generated. The resonant circuit placed inside the position indicator resonates with the electromagnetic wave (when the position indicator is located upon the sensor coil). Next, the transmission of the electromagnetic waves from the sensor coil is stopped to generate response electromagnetic waves by the resonant circuit of the position indicator. The response electromagnetic waves are then received by the sensor coil. The signal of the waves received by the sensor coil is passed to a signal processing portion through a receiver circuit, and its amplitudes and phases are analyzed in the processing portion. A switch information can be obtained through an arrangement, such as the resonant circuit of the position indicator wherein an amount of the phase shift of the response waves is detected. This is caused by depressing a physical switch mounted on the position indicator. Normally, the position indicator has at least one physical switch for providing that kind of switch information.

Referring to an example of an application mode of the position indicator, it is most frequently used to draw a desired graphical image or to indicate a specific point on the display connected to the computer system by moving the indicator on the position detecting plane of the input device watching on the display. Normally, a pointer is always displayed to indicate the corresponding position of the indicator on the display. Another example of the application mode may be provided, wherein an operation is performed for tracing a detecting plane of a paper fixed and a desired graphical image being drawn thereon. In either case a switch information may be provided by pressing a switch mounted on the position indicator at the indicated point. A further example of the application mode may be provided wherein a menu sheet, on which switches are illustrated and the position of which is correspondingly predetermined to the respective application, is overlaid on the position detecting planes, and pressing a physical switch mounted on the position indicator on the illustrated switch position in the menu sheet will input switch information.

As for the shape of most of the indicator, it can be referred to as a stylus pen control device such as a writing pen and a cursor in the shape of a mouse. The former indicates any desired point to input a coordinate information by using the point of the pen. In addition, a switching mechanism is provided in most cases, which senses a pressure or displacement at the pen point by pressing the pen point end to the sensor plane. Further more, the stylus pen may also be referred to, wherein it has a mechanism for detecting any change in the aforementioned pressure as a pen pressure. The stylus pen has a high operational capability since it can be handled as a normal pen, and can advantageously be used in either of the application modes mentioned above.

Also, the mouse has a flat bottom having a tangential plane with the position detecting plane, and can stand still on the position detecting plane. In order to move it, the whole body thereof is grasped with one hand of the operator as in the case of the mouse and then moved. On the surface of the chassis of the mouse, at least one push button is mounted to provide switch information. The mouse can almost similarly be used as the stylus pen in the application mode, but the stylus pen can be used in preference to the mouse where the position indicator is frequently moved or largely displaced. Also, the pen pressure detection cannot be attained by the mouse. It can, however, stably stand still on the detecting plane, and has the feature of holding itself in its condition without the operator holding it by hand so that, for exmple it is more suitable than the stylus pen for indicating a predetermined point for a long time. It also means that if the operator is not required to hold it by hand, then the other input device such as a key board is freely operable during that time.

The operational capability of the user can significantly be increased if they are suitably selected in use for the same position detecting plane, since the stylus pen and the cursor have the respective advantages as mentioned above. There is no difficulty in putting the stylus pen and the mouse separately on the detecting surface according to a certain technique, but it can be a complicated operation to pass either of the indicators from one hand to the other, and to find a place to put down the indicator not being used. Thus, putting the two indicators on the detecting plane may cause several problems.

SUMMARY OF THE INVENTION

An object of the present invention is to provide a position detector having both features of the stylus pen and the mouse. A further object of the present invention is to provide a position indicator which can easily be changed and properly be used with these two kinds of the functions thereof.

Since the position indicator according to the invention has a first structure and functions that are operable as a stylus pen, and a second structure and functions that is operable as a cursor, one of which can more suitably be selected to use for an input operation of the coordinate input device. Furthermore, it may include means for inhibiting simultaneously to enable the operation of said two indicating means so that the indicator can be used as a coordinate input device adapted to a single device having only one indicating means.

Also, When an extruding member of a reset switch is operably provided for pushing itself in or out from the bottom of the indicator, as for said means for inhibiting simultaneous operation of both of said indicating means, then any one of the functions of said two indicating means can automatically be validated in accordance with the positioning of the indicator on the detecting plane.

Also, when said indicating means is positioned at either end of said chassis, as for said means for inhibiting simultaneous operation of both of said indicating means, then no specific switching mechanism is required.

When the indicator is used as a mouse, the position indicator is stably put on the position detecting plane so that it can be held at the same position even if the operator releases the indicator from its hands.

Furthermore, when the indicator is used as a mouse, a transparent plate may be provided at the portion of the indicating means, thereby the position detecting plane can be observed through the plate if a menu sheet or a drawing is put on the position detecting plane.

Furthermore, the indicator according to the invention can make the two indicating means be an indicating means based upon various coordinate detecting techniques, thereby it can be adapted to several coordinate input devices.

BRIEF DESCRIPTION OF THE DRAWINGS

An embodiment of the invention will be described by way of example only with reference to the accompanying drawings, wherein.

DETAILED DESCRIPTION OF A PREFERRED EMBODIMENT

Figure 2:
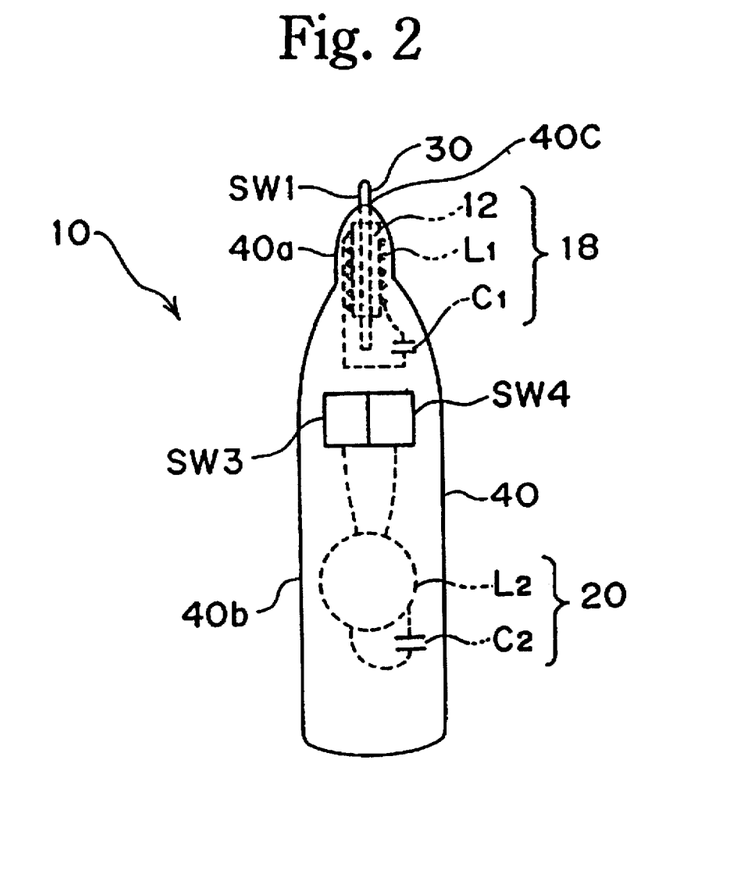
FIG. 2 is a schematic perspective view of an embodiment of a position indicator according to the present invention.

FIG. 2 is a schematic perspective view of an embodiment of a position indicator 10 according to the present invention. The embodiment shown in FIG. 2 uses an electromagnetic transceive system as to the coordinate detecting technique. The position indicator shown in FIG. 2 has a structure comprising a pen shaped portion and a mouse portion. That is, a chassis 40 of the position indicator 10 has a substantially cylindrical portion 40a that is in the shape of a pen at the top side, and a holding portion 40b that is in the similar shape of mouse and has a wider and thicker portion 40a at the rear side thereof. The position indicator 10 is provided with position indicating means 18 and 20, each of which includes a tuning circuit, in both of the cylindrical portion and the holding portion 40b. When the position indicator 10 according to the present invention is used as a stylus pen, the tuning circuit 18, which is provided at the cylindrical portion 40a, is able to operate, but when it is used as a mouse, the tuning circuit 20, which is provided in the holding portion 40b, is able to operate. Thus, the tuning circuit 18 and 20 respectively provided at the cylindrical portions 40a and 40b do not operate simultaneously so that the same tuning frequency can be used. Therefore, the position indicator according to this invention can also be used as a tablet adapted to a single device.

The substantially cylindrical portion 40a has a similar structure and functions as that of a conventional stylus pen. An opening 40c of the top of the cylindrical portion 40a has a core body 30 extruding from it, which is coaxially positioned with the cylindrical portion 40a. The core body 30 also slidably penetrates a penetrating hole of a ferrite core 12. The first tuning circuit 18 is placed within a proximate position to the top of the cylindrical portion 40a. In this embodiment, the tuning circuit 18 includes a coil L1 wounded around the ferrite core 12 and a capacitor C1 connected in parallel with the coil L1, and has a predetermined resonant frequency. The indicated coordinate is detected through an electromagnetic interaction between the first tuning circuit 18 that includes the coil L1 and the capacitor C1 and the sensor coil on the position detecting plane. Furthermore, the core body 30 provides a function to operate as a switch for providing switch information. That is, so-called pen down signal is generated by pressing the core body 30. Practically, an additional capacitor component is connected to the tuning circuit 18 to change the phase of the resonant signal, and allows detection of the phase change as the switch information.

If the position indicator 10 according to the present invention is used as a stylus pen, then the tuning circuit 18 of the cylindrical portion 40a operates as a position indicating means. Thus, the indicating operation is performed by holding the indicator 10 in upright position similarly as that of the stylus pen.

Figure 3:
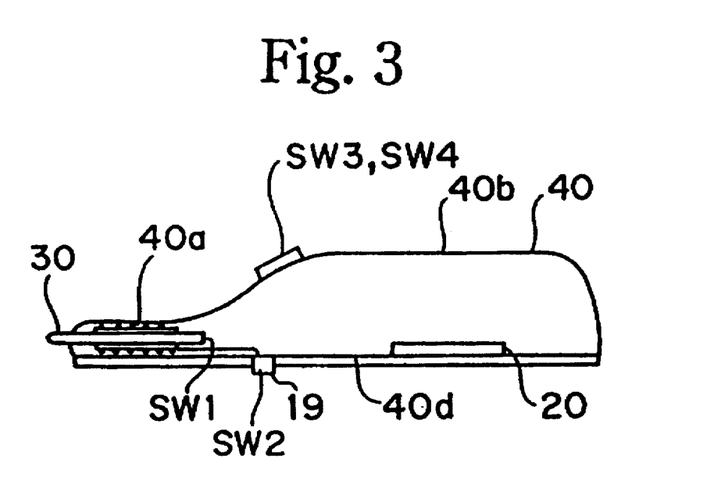
FIG. 3 is a schematic cross sectional view of the position indicator shown in FIG. 2.

In the holding portion 40b, a similar structure and function is provided as an ordinary mouse, but it is preferable to have a suitable width and thickness for the user to hold it with one hand. A schematic sectional view of the position indicator 10 of FIG. 2 is shown in FIG. 3. As shown in FIG. 3, the holding portion 40b of the indicator 10 is provided with a bottom member 40d that has a flat outer surface similarly as a conventional mouse. In this embodiment, a lower portion of the cylindrical portion (shown in FIG. 2) has also a flat surface, but in another embodiment, it may have a cylindrical shape as for the lower portion of the cylindrical portion 40a. In this embodiment, the portion 40a is extended from part of the holding portion 40b as shown, and here it is preferable that the axis of the portion 40a is substantially parallel with the bottom member 40d of the holding portion 40b. On the inner surface of the member 40d of the holding portion 40b, a second tuning circuit 20 is provided. In this example, the second tuning circuit 20 has a coil L2 wounded in the shape of a ring and a capacitor C2 connected in parallel with the coil L2 and has a predetermined resonant frequency. The indicated coordinate is detected by an electromagnetic interaction between the second tuning circuit 20, which includes the coil L2 and the capacitor C2, and the sensor coil on the position detecting plane. Furthermore, on the outer surface of the chassis 40 (preferably on the slope portion between the holding portion 40b and the cylindrical potion 40a as shown in FIG. 3), switch SW3 and SW4 are provided, and the tuning circuit 20 is connected to both of the switch SW3 and SW4 to provide switch information. That is, when switch SW3 or SW4 is turned on, an additional capacitor component is connected to the tuning circuit 20 resulting in a change in the phase of the resonant signal, which enables detection of the phase change as the switch information.

The second tuning circuit of the holding portion 40b operates as a position indicating means when the position indicator according to this invention is used as a mouse. Then, the bottom member 40d is used under the condition that the member is facing toward the position detecting plane on which the position indicator is placed. The holding portion 40b of the position indicator is held by one hand of the user, then it is moved to turn on the switch SW3 and SW4 at the desired point.

In FIG. 3, the extruding member 19, which is operably provided for pushing itself in or out from the bottom member 40d of the indicator 10, comprises part of the switch SW2, and is operable in connection with an electrical on and off action. The switch SW2 is a release switch for setting tuning circuit 18 to invalid state during the valid state of the tuning circuit 20, i.e., while using it as a mouse. When the indicator 10 is used as the mouse, and the tuning circuit 18 within the cylindrical portion 40a is in its valid state, then the tuning circuit 18 is also located within its detectable range so that there is an undesirable possibility that the coordinate information could be provided from both of the first and second tuning circuits. Thus the release switch SW2 is provided in order to make the first tuning circuit set to the invalid state, when this circuit is not required. Here, the detectable range of the position indicating means that is; the height from the position detecting plane of the tuning circuit, which is located within the position indicator, is lower than the height of surely detectable coordinate.

Figure 4:
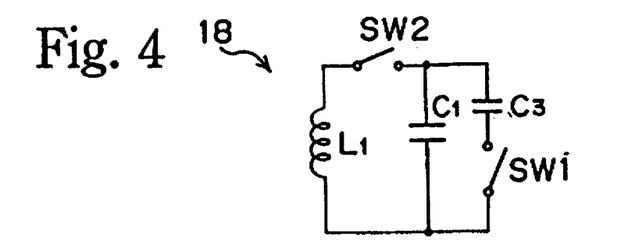
FIG. 4 is a schematic circuit diagram showing a first tuning circuit of the position indicator according to the present invention.

The extruding member 19 of the release switch SW2 is retracted to house itself within the bottom member 40d when the position indicator 10 is positioned with the position detecting plane facing toward the bottom member 40d, while it is extruded when the bottom member 40d is set apart from the position detecting plane. Such a mechanical structure is of general purpose. The state of the extruding member in and out, which results by contacting or separating condition between the bottom member 40d and the position detecting plane, corresponds with on and off on the electrical contact of the release switch SW2. FIG. 4 is a schematic circuit diagram showing an example of the first tuning circuit 18. The resonant frequency of the first tuning circuit is determined by the parallel resonant circuit having the coil L1 and the capacitor C1. When the position indicator 10 is used as a mouse, the release switch SW2 is set to off, and the capacitor C1 and the coil L1 of the first tuning circuit 18 are separated from each other so that they are not operating as an indicator (invalid state). When the position indicator 10 is used as a stylus pen, the switch SW2 is set to on and the coil L1 of the first tuning circuit 18 and what are connected with each other so that they are operating as an indicator (valid state).

When the position indicator 10, however, is used as a stylus pen in the embodiment of FIG. 1, it may not be required to put the second tuning circuit 20 into the invalid state, since the second tuning circuit is inevitably in a higher position than the detachable region upon the position detecting plane, wherein no electromagnetic interaction is generated between the circuit and the sensor coil. The position indicator according to this invention may be designed to have any one of a great many shapes whereby the second tuning circuit comes to exist within although the position indicator is held in an upright position. Then, a mechanism may be added with which the second tuning circuit alternates between the invalid state and the valid state by turning the switch SW2 on or off.

In FIG. 4, an additional capacitor C3 is connected to the parallel resonant circuit when the SW1 is turned on by pressing the core body 30.

Figure 5:
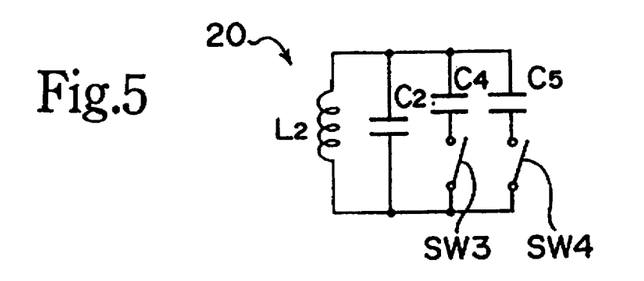
FIG. 5 is a schematic circuit diagram showing a second tuning circuit of the position indicator according to the present invention.

FIG. 5 is a schematic circuit diagram showing a circuit example of the second tuning circuit 20. The resonant frequency is determined by the parallel resonant circuit including the coil L1 and the capacitor C2. Switches SW3 and SW4 operate to add capacitors C4 and C5 to the resonant circuit respectively when they are turned on.

Figure 6:
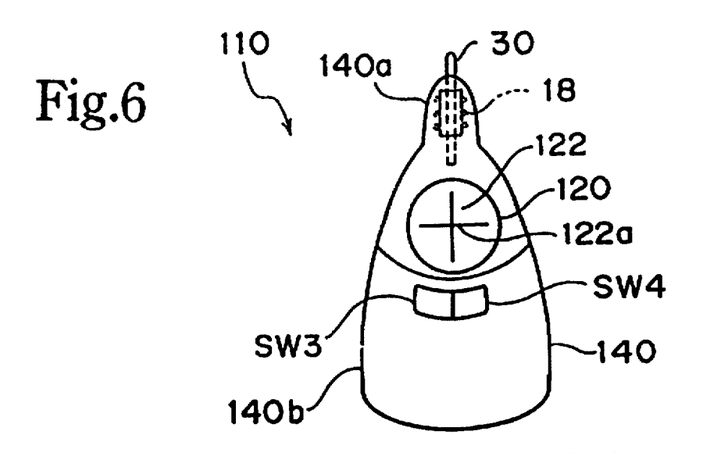
FIG. 6 and 7 are a perspective view of another embodiment of a position indicator according to the present invention.
Figure 7:
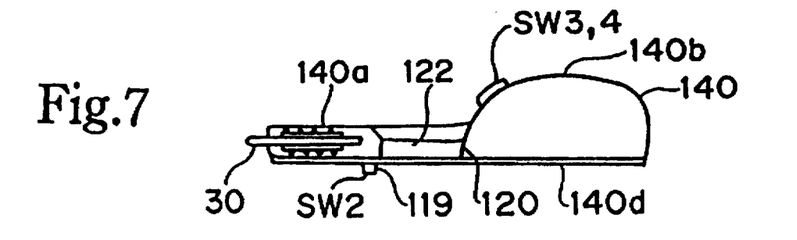

FIG. 6 and 7 show another example of the present invention. A chassis 140 of an indicator 110 comprises a substantially cylindrical portion 140a in the shape of a pen and a holing portion 140b of upper part of the mouse. A transparent plate 122 is provided in a circular portion within the second tuning circuit 120 of the holding portion 140b, and a cross hairs 122a is drawn in the center of the circular portion. That is, a mouse structure having the cross hairs 122a is built in to the position indicator according to this invention. The remaining portion of the transparent plate 122 has a similar structure to the embodiment of FIG. 2. The holding portion 140b is constructed by the rear portion of the chassis 140 making a wider and thicker canvass shape in order for the user to easily grasp at the rear portion rather than the transparent plate 122. FIG. 7 is a schematic cross sectional view of position indicator 110. Switches SW3 and SW4 are provided in the slope portion of the holding portion 140b. In this example wherein it is used as a cursor, the user can operate the indicator while observing the position detecting plane through the transparent plate. The position indicator 110 of this type is useful in the case where the position indicator is moved while a document placed upon the position detecting plane is observed, and where a particular point of a document is being indicated for a long time.

Figure 8:
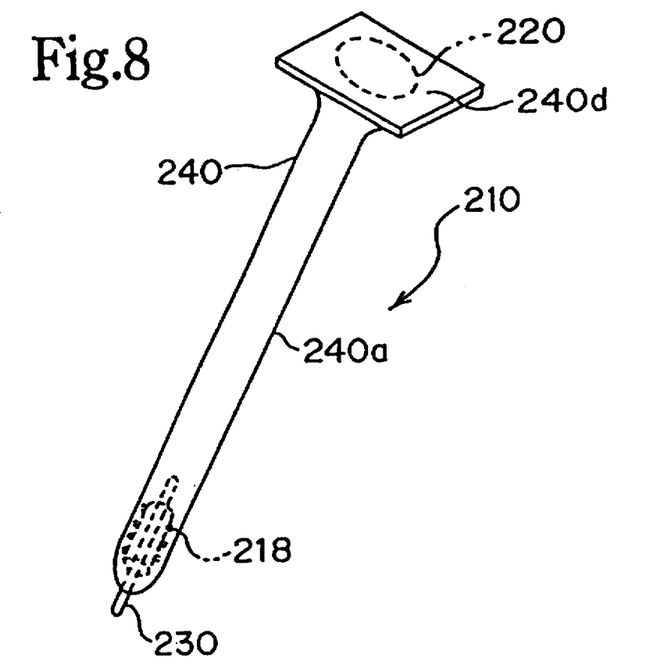
FIG. 8 and 9 are a schematic perspective view of another embodiment of a position indicator according to the present invention.
Figure 9:
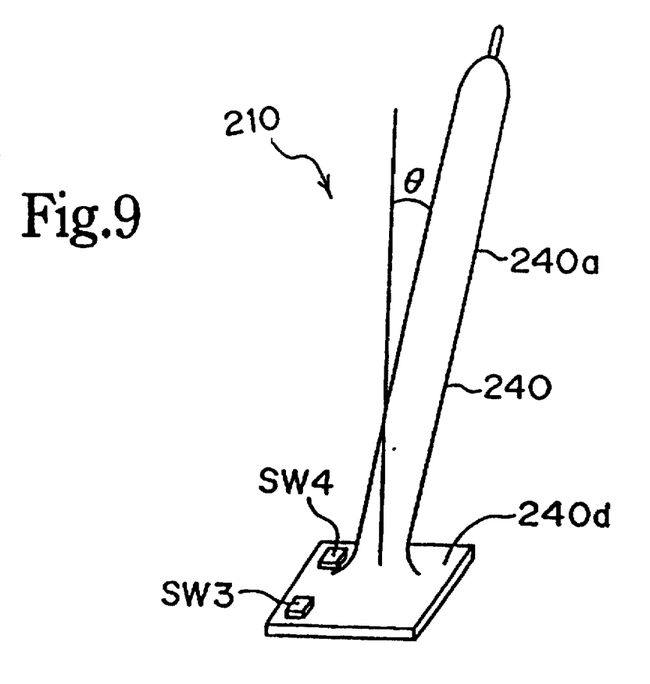

FIG. 8 and 9 are perspective views showing further another embodiment of an indicator 210. The aforementioned embodiment rather has the shape of a chassis, which is basically formed as a mouse, and to which a stylus pen is added, while the embodiment of FIG. 8 and 9 has the shape of a chassis, which is basically formed as a stylus pen, and to which a mouse is added. As shown in FIG. 8, the chassis 240 has a substantially cylindrical portion 240a of a long and narrow form that is similar to an ordinary stylus pen, and a flat plate portion 240d provided at the rear end of the cylindrical portion 240a. The cylindrical portion 240a, which corresponds to the pen shaped portion of this embodiment, may include not only the first tuning circuit 218, but also the same inner structure as the ordinary stylus pen. The core body 230 extruding from the top of the cylindrical portion 240a also has the same structure as that of the embodiment described in regard to constructing a switch for proving switch information. The first tuning circuit 218 operates as an indicating means when used as a pen.

The flat plate portion 240d corresponds to the mouse portion in this embodiment. One side of the portion 240d is fixed to the end of cylindrical portion 240a, while the other side forms a flat bottom for operating as a mouse. It should be noted here that the bottom side includes no release switch for the first tuning circuit, for example the extruding member 19 as described in the embodiment above. This is because the first tuning circuit positioned inside the cylindrical portion 240a is positioned far outside the detectable region from the position detecting plane so that no release switch is required. The second tuning circuit 220 is placed, in the flat plate portion 240d, which is operable as a indicating means when used in the mouse condition. As shown in FIG. 9, the cylindrical portion 240a may take a slope position, as generally indicated by the angle θ rather than an upward position in relation to the flat plate 240d. If the slope position is adapted, then the slope may be selected to an extent wherein it can just maintain an upward position without the support of the users hand. The cylindrical portion 240a may also take an upright position in relation to the flat plate 240a. Furthermore, another method for connecting the cylindrical potion 240a to the flat plate portion 240d may be attained via a structure, which enables the top of the cylindrical portion 240a to rotate around the vertical axis in relation to the flat panel portion 240d in the range of an inclination with which the cylindrical portion 240a is stably standing.

On the surface of the flat plane 240d, i.e., the side on which the cylindrical portion 240a exists as shown in FIG. 8, switches SW3 and SW4 are provided for changing the phase of the resonant signal of the second tuning circuit 220. An additional capacitor (not shown) is connected to the second tuning circuit 220 by turning on the switches SW3 and SW4.

Figure 10:
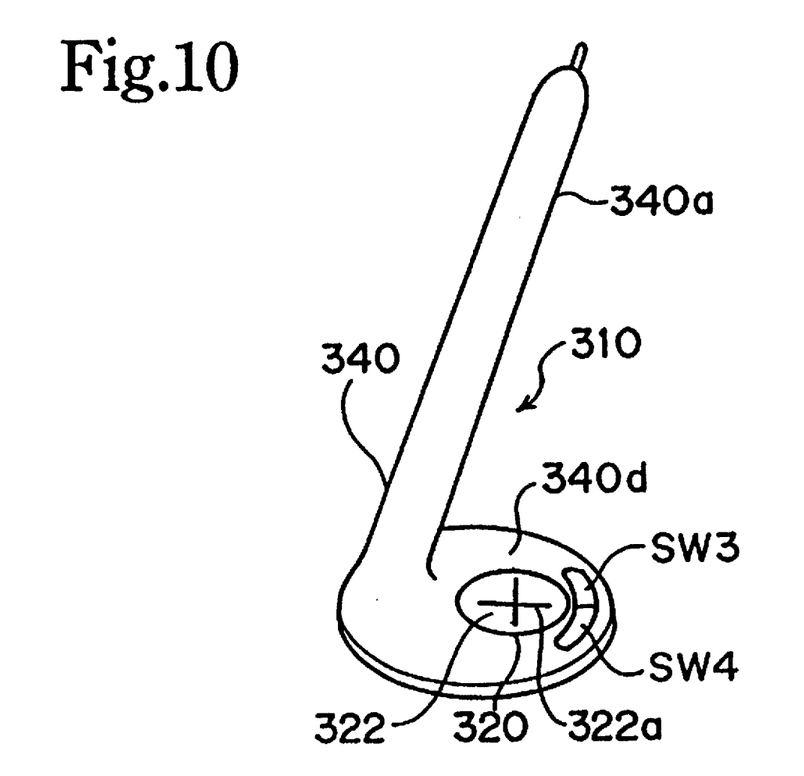
FIG. 10 is a schematic perspective view of another embodiment of a position indicator according to the present invention.

FIG. 10 is another embodiment which is similar to the embodiments of FIG. 8 and 9. The chassis 340 includes a substantially cylindrical portion 340a forming a pen like portion, and a flat plate portion 340d forming mouse portion. The structure of the cylindrical portion 340a is similar to the embodiment shown in FIG. 6. The flat plate portion 340d of the embodiment of FIG. 10 is formed by a sustantially cylindrical portion, and the cylindrical portion 340a is extruding from the part of the one surface of the portion 340d. A transparent plate 322 is also provided at a circular portion internal to the coil of the second tuning circuit 320. A cross hairs 322a is provided on the transparent portion 322. On the surface of the transparent plate 322, two switches SW3 and SW4 are also positioned for providing switch information.

Concerning application of the position indicator according to the present invention, it is common to use it as a stylus pen for a wider range of application than normal, while it is used as mouse immediately when any requirement for a mouse occurs in specific application. To point out an example of a method for utilizing the indicator as a mouse, there is a method wherein the position indicator keeps positioning on a functional display, which is frequently used for displaying on the menu. Then if the user desires to use the function, the switches SW3 and SW4 are simply pressed. Otherwise, the user needs not touch the cursor so that user can devote oneself to operate the keyboard. Thus for the application wherein a predetermined point is stably indicated for a long time, the mouse is more suitable than the stylus pen in that it is easy to rotate itself and to change the indicating position when the user keeps one's hand off.

Thus, the present invention is described based on the embodiment applied for the position indicator that is used with the coordinate input device of the electromagnetic tranceive method, but the present invention can also be applicable to the position indicator of the coordinate input device using the other coordinate detecting method. For example, in a detecting method using indicator transmission, wherein electromagnetic waves are transmitted by the position indicator inside of which a power supply and an oscillator are included, and the waves are received by the sensor coil, the present invention may be applied by a position indicator comprising a pen shaped portion having a first oscillator and a cursor shaped portion having a second oscillator. In a further detecting system using oscillation, the present invention may be applied wherein an amplifier is oscillated, which is connected to external circuit via an electromagnetic coupling between a tuning circuit positioned within the position indicator and two sensor coils orthogonally positioned each other upon the position detecting plane, so the present invention may be applied by the position indicator comprising a pen shaped portion having a first resonant circuit and a mouse portion having a second resonant circuit.

The present invention comprises the structure and functions integrally included within a single position indicator having a pen shaped portion available for a stylus pen and a mouse shaped portion available for a cursor, thus it can provide two input ways by a single coordinate input device. Furthermore, both said input ways are not enabled at the same time so that the present invention can be used as a coordinate input device adapted to a single device, and be made a simplified structure. Also, the present invention can be attained by a single position indicator so that an excessive space is not required for the position detecting plane itself and its peripheral.

What is claimed is:

1. A position indicator for use in an input coordinate device for providing a desired coordinate point on a position detecting plane, comprising:
   a) a chassis having both a pen shaped portion formed by a substantially cylindrical portion and a mouse portion including a flat bottom;
   b) a first indicating means, disposed within said pen shaped portion, including a core body having an end extending externally from said pen shaped portion and a first switch cooperating with movement of said core body;
   c) a second indicating means, disposed within said mouse portion, including a second switch;
   d) a third switch adapted to inhibit operation of said first indicating means when said second indicating means is being used; and
   e) a movable member extending from said flat bottom such that said member is engageable with the detecting plane when said mouse portion is in use, said member being operably connected to said third switch such that movement of said member when engaged with the detecting plane is effective to operate said third switch so as to render said first indicating means inoperative when said mouse portion is in use.

2. A position indicator as in claim 1, wherein:
   a) an axial direction of said cylindrical portion is substantially parallel to said flat bottom.

3. A position indicator as in claim 1, wherein:
   a) said mouse portion includes a transparent plate through which the detecting plane is visible; and
   b) said transparent plate includes a cross-hair.

4. A position indicator as in claim 1, wherein:
   a) said first and second indicating means include respective tuning circuits of equal resonant frequencies.

5. A position indicator for use in an input coordinate device for providing a desired coordinate point on a position detecting plane, comprising:
   a) a chassis having both a pen shaped portion formed by a substantially cylindrical portion and a mouse portion including a flat bottom;
   b) a first indicating means, disposed within said pen shaped portion, including a core body having an end extending externally from said pen shaped portion and a first switch cooperating with movement of said core body;

c) a second indicating means, disposed within said mouse portion, including a second switch; and d) said first and second indicating means are disposed at opposite ends of said chassis such that when one of said first and second indicating means is in use, the other one of said first and second indicating means is disposed away from the detecting plane so as to be rendered inoperative with respect to the detecting plane.

6. A position indicator as in claim 5, wherein:

a) said flat bottom is disposed at one end of said cylindrical portion.

7. A position indicator as in claim 6, wherein:

a) said cylindrical portion is disposed at an angle with respect to said flat bottom.

8. A position indicator as in claim 5, wherein:

a) said mouse portion includes a transparent plate through which the detecting plane is visible; and b) said transparent plate includes a cross-hair.

9. A position indicator as in claim 5, wherein:

a) said first and second indicating means include respective tuning circuits of equal resonant frequencies.

10. A position indicator for use in an input coordinate device for providing a desired coordinate point on a position detecting plane, comprising:

a) a chassis having both a pen shaped portion formed by a substantially cylindrical portion and a mouse portion including a flat bottom;

b) a first indicating circuit, disposed within said pen shaped portion, including a core body having an end extending externally from said pen shaped portion and a first switch;

c) a second indicating circuit, disposed within said mouse portion, including a second switch;

d) a third switch adapted to inhibit operation of said first indicating circuit when said second indicating circuit is being used; and e) a movable member extending from said flat bottom such that said member is engageable with the detecting plane when said mouse portion is in use, said member being operably connected to said third switch such that movement of said member when engaged with the detecting plane is effective to operate said third switch so as to render said first indicating circuit inoperative when said mouse portion is in use.

11. A position indicator as in claim 10, wherein:

a) said first and second indicating circuits include respective inductors and capacitors.

12. A position indicator as in claim 10, wherein:

a) said core body is movable; and b) said first switch cooperates with movement of said core body.

13. A position indicator for use in an input coordinate device for providing a desired coordinate point on a position detecting plane, comprising:

a) a chassis having both a pen shaped portion formed by a substantially cylindrical portion and a mouse portion including a flat bottom;

b) a first indicating circuit, disposed within said pen shaped portion, including a core body having an end extending externally from said pen shaped portion and a first switch;

c) a second indicating circuit, disposed within said mouse portion, including a second switch; and d) said first and second indicating circuits are disposed at opposite ends of said chassis such that when one of said first and second indicting circuits is in use, the other one of said first and second indicating circuits is disposed away from the detecting plane so as to be rendered inoperative with respect to the detecting plane.

14. A position indicator as in claim 13, wherein:

a) said first and second indicating circuits include respective inductors and capacitors.

15. A position indicator as in claim 13, wherein:

a) said core body is movable; and b) said first switch cooperates with movement of said core body.

* * * * *